(12) United States Patent  
Chen et al.

(10) Patent No.: US 7,514,380 B2
(45) Date of Patent: Apr. 7, 2009

(54) SELECTIVELY PERMEABLE PROTECTIVE STRUCTURE AND ARTICLES THEREFROM

(75) Inventors: John Chu Chen, Hockessin, DE (US); Sam Louis Samuels, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/506,731

(22) Filed: Aug. 18, 2006

(65) Prior Publication Data

US 2008/0176468 A1    Jul. 24, 2008

(51) Int. Cl.
*B32B 27/12* (2006.01)
*B32B 25/10* (2006.01)
*B32B 3/00* (2006.01)

(52) U.S. Cl. ............... 442/394; 442/399; 428/315.5
(58) Field of Classification Search ............ 442/394, 442/399, 401
See application file for complete search history.

(56) References Cited

U.S. PATENT DOCUMENTS

| 3,950,289 | A | 4/1976 | D'Amato |
| 4,014,831 | A | 3/1977 | Bock et al. |
| 4,685,274 | A | 8/1987 | Garwood |
| 4,840,271 | A | 6/1989 | Garwood |
| 4,956,212 | A | 9/1990 | Bekele |
| 5,025,611 | A | 6/1991 | Garwood |
| 5,103,618 | A | 4/1992 | Garwood |
| 5,115,624 | A | 5/1992 | Garwood |
| 5,346,735 | A | 9/1994 | Logan |
| 5,387,470 | A | 2/1995 | Parnell |
| 5,402,622 | A | 4/1995 | Stockley |
| 5,533,622 | A | 7/1996 | Stockley |
| 5,556,674 | A | 9/1996 | Meilhon |
| 5,597,869 | A | 1/1997 | Wang |
| 5,770,287 | A | 6/1998 | Miranda |
| 5,843,540 | A | 12/1998 | Heydarpour |
| 5,885,699 | A | 3/1999 | Watson |
| 5,916,613 | A | 6/1999 | Stockley |
| 6,329,458 | B1 | 12/2001 | Takesue |
| 6,579,948 | B1 | 6/2003 | Tan |
| 2001/0019971 | A1 | 9/2001 | Hayashi |
| 2002/0013421 | A1 | 1/2002 | Takesue |
| 2002/0099120 | A1 | 7/2002 | Takesue |
| 2002/0111407 | A1 | 8/2002 | Takesue |
| 2003/0198715 | A1 * | 10/2003 | Morris et al. ............... 426/106 |
| 2004/0077248 | A1 * | 4/2004 | Kurahashi et al. ........... 442/401 |

FOREIGN PATENT DOCUMENTS

WO    WO 2003/089240 A1    10/2003

* cited by examiner

*Primary Examiner*—Lynda Salvatore

(57) ABSTRACT

An article comprising a selectively permeable membrane supported on a support is disclosed wherein the article has moisture vapor transmission rate of at least 1800 $g/m^2/24\ h$ and the selectively permeable membrane comprises a composition comprising an organic acid-modified ionomer.

21 Claims, No Drawings

SELECTIVELY PERMEABLE PROTECTIVE STRUCTURE AND ARTICLES THEREFROM

This invention relates to a selectively permeable structure having high moisture vapor permeability and low permeability to others such as chemicals and to articles made therefrom.

BACKGROUND

Personal protection from exposure to harmful chemical and biological agents is often of concern to firefighters and similarly situated personnel. Such protection often includes the use of apparel that provides a barrier to such agents. Butyl rubber is often used in standard protective clothing. However, garments made from butyl rubber are bulky and nearly impermeable to air and moisture (I. Lee, Yang and Wilusz; Polymer Engineering & Science, 1996, 36, 1217), resulting in unbearable levels of heat inside the garments during use.

Various permeable materials having a wide range of mechanical and transport properties are known. Depending upon the particular application in which the permeable material is to be employed, however, certain combinations of properties are required. For example, in a protective apparel application, it is desirable that the material may transport water vapor and block the transport of harmful chemicals and/or biological agents, and be lightweight and flexible over a broad temperature range. A need exists for a material that can be a flexible, solid material with membrane characteristics that facilitate the transport of water vapor, for example, from a wearer of membrane-containing apparel to the atmosphere; allow moisture to permeate the garments to the extent necessary to afford comfort to the wearer, thus reducing heat stress; and block entry of certain chemical compounds and biological agents.

Various references describe semipermeable materials produced from a variety of polymers that may be useful for protective garments. See, e.g., U.S. Pat. No. 6,579,948.

Many previous permeable membranes are microporous (i.e., permeable due to the presence of microscopic pores through which vapor can pass). Microporous membranes, which may be laminated on or between nonwoven textiles, have increased comfort, but may not provide adequate barriers because of their nonselective permeability. They may also have low tear strength and their surfaces may be easily fouled.

Because no single material has emerged which satisfies all of the technical requirements and that presents a cost-effective alternative, it is desirable to provide a selectively permeable membrane or structure or layer that displays a combination of mechanical properties, low temperature flexibility, selective transport, ease of processability, and cost-effectiveness, so as to render it suitable for use in a wide variety of applications.

SUMMARY OF THE INVENTION

This invention provides a selectively permeable protective structure or article, having a moisture vapor transmission rate (MVTR) measured according to ASTM F2298 of at least 1800 g/m$^2$/24 h, comprising or consisting essentially of a support (or substrate) and a selectively permeable membrane comprising or produced from a composition comprising or consisting essentially of an organic acid-modified ionomer.

DETAILED DESCRIPTION OF THE INVENTION

All percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

"(Meth)acrylic acid" includes methacrylic acid and/or acrylic acid and "(meth)acrylate" includes methacrylate and/or acrylate.

Thermoplastic compositions are polymeric materials that can flow when heated under pressure. Melt index (MI) is the mass rate of flow of a polymer through a specified capillary under controlled conditions of temperature and pressure. Melt indices reported herein are determined according to ASTM 1238 at 190° C. using a 2160 g weight, with values of MI reported in grams/10 minutes.

A protective structure or article includes a support and a polymer composition. The selectively permeable protective structure provides a combination of mechanical properties, low temperature flexibility, selective transport, ease of processability, and cost-effectiveness.

The protective structure can be used in protective garments such as for health care applications including gowns and other apparel for operating room, patient visitor, medical, dental, and similar applications. The apparel can be selected, for example, from the group consisting of gowns, aprons, shirts, trousers, overcoats, gloves, shoes, boots, overboots, socks, hoods, hats, caps, masks, and eye goggles. Other health care equipment can be selected, for example, from the group consisting of screens, drapes, and breathable dressings.

Similarly, protective garments may also be used in military, food preparation, transportation, industrial and manufacturing procedures other applications that require protection from biological and/or chemical agents, heat, irritants and the like. The unique properties of the selectively permeable structure are useful for applications including protective clothing for "first responders" in chemical threat situations, or for hazardous materials handling. In addition to apparel listed above for health care applications, protective apparel for these applications may also include helmets and gas masks.

The selectively permeable protective structure may also be suitable for fabrics used in responding to biological and/or chemical spills. It may be used for fabrics for tents, awnings and other shelters. These uses may be protective, since they block transmission of the agent from one place to another.

A substrate can be a vehicle to aid in incorporating the composition into the desired articles, and also provides mechanical support for the barrier composition. So that permeability is not hindered, preferably a substrate has water vapor diffusion that is greater than the water vapor diffusion of the selectively permeable membrane so that the water vapor diffusion characteristics of the structure are essentially provided by the selectively permeable composition. That is, the substrate does not substantially affect the passage of water vapor through the layered structure, and for example, may have a measured MVTR of at least 1.8, 4, 5, or even 10, Kg m$^2$/24 hours.

For film samples, water vapor permeation tests are conducted on a Mocon Permatran-W® 101K, following ASTM D6701-01, at 37.8° C. Water vapor permeation values (WVPV) on film samples are reported in g-mil/m$^2$-24 h while MVTR are reported g/m$^2$-24 h. The composition or membrane has MVPV at least 4000, or at least 5000, g-mil/m$^2$/24 h and include a chemical barrier value.

Another method for determining material "breathability," or evaporative resistance, uses a Guarded Sweating Hotplate Test according to ASTM F1868, ISO 11092.

Any support or substrate meeting the desired characteristics disclosed above in the Background can be used with a layer of the selectively permeable arranged in overlying fashion. Examples include a textile or porous sheet material. For example, the composition can be in the form of a film or sheet and the film is mechanically held or fastened in overlaying fashion adjacent to a textile. In an alternate embodiment, a layer of the composition may be adhered to a textile support in overlaying fashion in a discontinuous pattern, for example, by means of heat sealing, high frequency welding or adhesive. Sheets made from synthetic fiber spun fabrics, such as nonwoven textiles, may be used as a textile substrate. Cloth that is woven, knitted or the like is also suitable as a textile substrate.

For example, a fabric may comprise a 50% nylon-50% cotton blend fabric (also known as NYCO) woven to military specifications such as those by Bradford Dyeing Association, Inc., in Bradford, R.I.

A fabric may comprise a flame retardant fiber such as an aramid fiber. Additives can be used with the aramid such as up to as much as 10% of other polymeric material can be blended with the aramid or that copolymers can be used having as much as 10% of other diamine substituted for the diamine of the aramid or as much as 10% of other diacid chloride substituted for the diacid chloride of the aramid. Aramids include poly(paraphenylene terephthalamide), poly(metaphenylene isophthalamide, or combinations thereof. Such aromatic polyamide organic fibers and various forms of these fibers are available from E. I. du Pont de Nemours and Company, Wilmington, Del. (DuPont).

A substrate can be a porous sheet material or comprises a fluoropolymer. A substrate can be sheet material made with expanded polytetrafluoroethylene that is available from many companies, including W. L. Gore & Associates of Wilmington, Del. Other porous substrates include porous or microporous polyurethane films, certain flash spun non-woven fabrics, such as flash spun polypropylene, and other spun bonded polymer fabrics, filter materials from companies such as Millipore, nano- or micro-fiber structures, natural or synthetic fibers, other related supports that add dimensional stability, or combinations of two or more thereof.

While in one embodiment the substrate has been described as a textile, the substrate can be any other material that is capable of accommodating thereon one or a plurality of selectively permeable membrane layers, or accommodating therein a dispersion of the selectively permeable composition.

The protective structure can be in the form of a laminate wherein the composition is continuously adhered, either indirectly or through at least one intervening layer, to a substrate comprising the textile or porous sheet material of the support. The composition can also be dispersed throughout the substrate such as a loosely woven fabric where the composition fills gaps in the substrate and does not just adhere on the surface of a substrate. The substrate can be impregnated inside the selectively permeable membrane through lamination or coextrusion process to have the permeable compositions on both sides of the substrate.

The organic acid-modified ionomer can comprise, consist essentially of, or consist of one or more E/X/Y copolymers where E is derived from ethylene, X is derived from at least one $C_3$-$C_8$ α,β-ethylenically unsaturated carboxylic acid, and Y is derived from a softening comonomer, or ionomers of the E/X/Y copolymers, wherein X is from about 3 to 35, 4 to 25, or 5 to 20, weight % of the E/X/Y copolymer, and Y is from 0 to about 35, 0.1 to 35, or about 5 to 30, weight % of the E/X/Y copolymer.

X includes unsaturated acids such as acrylic acid, methacrylic acid, maleic acid, fumaric acid, and itaconic acid; maleic (maleic half-esters) or fumaric monoesters including esters of $C_1$ to $C_4$ alcohols, such as, for example, methyl, ethyl, n-propyl, isopropyl, and n-butyl alcohols.

Softening comonomer can disrupt the crystallinity of an acid copolymer making the polymer less crystalline including alkyl (meth)acrylate where the alkyl groups have from 1 to 8 or 1 to 4 carbon atoms.

The composition can comprise, consist essentially of, or consist of the E/X/Y copolymer and one or more organic acids or salts thereof. The organic acid or salt thereof can be present in the composition from 1 to 50 weight % and be selected from saturated or unsaturated monobasic or polybasic carboxylic acids having fewer than 36 carbon atoms, optionally substituted with from one to three substituents independently selected from the group consisting of $C_1$-$C_8$ alkyl, OH and $OR^1$, each $R^1$ is independently $C_1$-$C_8$ alkyl, $C_1$-$C_6$ alkoxyalkyl or $COR^2$; and each $R^2$ is independently H or $C_1$-$C_8$ alkyl.

The composition can also comprise, consist essentially of, or consist of the E/X/Y copolymer, the organic acid or salt thereof, and optionally one or more non-iomeric polymers. The non-iomeric polymer can be present in the composition from about 0.1 to about 40 weight % of one or more non-iomeric ethylene-containing or polypropylene-containing polymers.

At least 60%, 70%, 80%, 90%, or even 100% of the acidic groups in the E/X/Y copolymer and the organic acid are nominally neutralized with metal ions to the corresponding salts, and the metal ions present in the mixture comprise a preponderance of alkali metal ions, preferably sodium or potassium ions, more preferably potassium ions.

Ethylene acid copolymers with high levels of acid (X) can be difficult to prepare in continuous polymerizers because of monomer-polymer phase separation. This difficulty can be avoided by use of "co-solvent technology" as described in U.S. Pat. No. 5,028,674 or by employing somewhat higher pressures than those at which copolymers with lower acid levels can be prepared.

Specific acid copolymers include ethylene/(meth)acrylic acid copolymers. They also include ethylene/(meth)acrylic acid/n-butyl (meth)acrylate, ethylene/(meth)acrylic acid/isobutyl (meth)acrylate, ethylene/(meth)acrylic acid/methyl (meth)acrylate, and ethylene/(meth)acrylic acid/ethyl (meth) acrylate terpolymers.

Other acid copolymers include ethylene/maleic acid and ethylene/maleic acid monoester dipolymers; and ethylene/maleic acid monoester/n-butyl (meth)acrylate, ethylene/maleic acid monoester/methyl (meth)acrylate, ethylene/maleic acid mono-ester/ethyl (meth)acrylate terpolymers.

Unmodified, melt processible ionomers can be prepared from acid copolymers such as ethylene/(meth)acrylic acid copolymers, by treatment with a basic compound capable of neutralizing the acid moieties of the copolymer.

Basic inorganic metal compound capable of neutralizing acidic groups in components may be provided by adding the stoichiometric amount of the basic compound calculated to neutralize a target amount of acid moieties in the acid copolymer and organic acid(s) in the blend (herein referred to as "% nominal neutralization" or "nominally neutralized"). Thus, sufficient basic compound is made available in the blend so that, in aggregate, the indicated level of nominal neutralization could be achieved. Nominal neutralization levels greater than 70, 80, or 90% of all acid moieties in the composition are preferred.

Basic compounds include compounds of alkali metals, such as lithium, sodium, potassium, or combinations of such cations. Preferred are sodium and potassium salts or combinations of sodium and potassium. Basic compounds of note include formates, acetates, nitrates, carbonates, hydrogencarbonates, oxides, hydroxides or alkoxides of the ions of alkali metals such as sodium hydroxide, potassium hydroxide, sodium carbonate and potassium carbonate.

The organic acids include saturated or unsaturated monobasic carboxylic acids optionally substituted with one to three substituents independently selected from the group consisting of $C_1$-$C_8$ alkyl, OH and $OR^1$; or polybasic carboxylic acids optionally substituted with from one to three substituents independently selected from the group consisting of $C_1$-$C_8$ alkyl, OH and $OR^1$.

Particularly useful organic acids include $C_4$ to less than $C_{36}$ (e.g., $C_{34}$), more particularly $C_6$ to $C_{26}$, and even more particularly $C_6$-$C_{22}$ acids. Monobasic carboxylic acids include acids having only one carboxylic acid moiety. Specific organic acids include, but are not limited to, caproic acid, caprylic acid, capric acid, lauric acid, palmitic acid, stearic acid, isostearic acid, behenic acid, erucic acid, oleic acid, and linoleic acid.

Examples of monobasic acids substituted with alkyl include isostearic acid and citronellic acid. Examples of monobasic acids substituted with hydroxy include glycolic acid, lactic acid, 3-hydroxybutyric acid, 2-hydroxyisobutyric acid, 2-hydroxycaproic acid, 6-hydroxycaproic acid, 10-hydroxydecanoic acid, 12-hydroxydodecanoic acid, 12-hydroxystearic acid, or combinations of two or more thereof.

Hydroxy-substituted organic acid includes derivatives wherein the H of the hydroxyl moiety is replaced by $R^1$.

Non-ionomeric polymers including ethylene-containing polymer, ethylene/vinyl acetate copolymer, ethylene/alky (meth)acrylate copolymer, propylene-containing polymer, or combinations of two or more thereof can provide better processibility, improved strength, and toughness. The composition may contain up to 35 (e.g., 0.1 to 35, 0.1 to 15, or 0.1 to 10) weight % of non-ionomeric polymer.

Ethylene-containing polymers include polyethylene homopolymers and copolymers such as high density polyethylene, low density polyethylene, linear low density PE, very low PE or ultra-low density PE, metallocene PE; ethylene propylene copolymers; ethylene/propylene/diene monomer terpolymers; and ethylene copolymers derived from copolymerization of ethylene and at least one comonomer selected from the group consisting of alkyl (meth)acrylate, vinyl acetate, carbon monoxide (CO), maleic acid anhydride and maleic anhydride derivatives, such as maleic diesters.

Polyethylene (PE) homopolymers and copolymers useful for the compositions described herein can be prepared by a variety of well known methods such as the Ziegler-Natta catalyst polymerization (U.S. Pat. No. 4,076,698 and U.S. Pat. No. 3,645,992), metallocene catalyzed polymerization, Versipol® catalyzed polymerization and by free radical polymerization.

The densities of suitable PE range from about 0.865 g/cc to about 0.970 g/cc.

Ethylene copolymers having small amounts of a diolefin component such as butadiene, norbornadiene, hexadiene and isoprene are also generally suitable. Terpolymers such as ethylene/propylene/diene monomer are also suitable.

Suitable polymers for ethylene-containing polymers may also include ethylene copolymers obtained from copolymerization of ethylene with at least one polar monomer. Such suitable copolymers include: ethylene/vinyl acetate copolymers, ethylene/acrylic ester copolymers, ethylene/methacrylic ester copolymers, ethylene/vinyl acetate/CO copolymers, ethylene/acrylic ester/CO copolymers, and/or mixtures of any of these.

The composition may comprise at least one ethylene/vinyl acetate copolymer including copolymers derived from the copolymerization of ethylene and vinyl acetate or copolymers derived from the copolymerization of ethylene, vinyl acetate and an additional comonomer. The relative amount of the vinyl acetate comonomer incorporated into ethylene/vinyl acetate copolymers can vary from a few weight percent up to as high as 45 weight percent of the total copolymer or even higher.

"Ethylene/alkyl (meth)acrylate copolymer includes copolymers of ethylene and alkyl acrylates or alkyl methacrylates wherein the alkyl moiety contains from one to eight carbon atoms. Examples of alkyl acrylates include methyl acrylate, ethyl acrylate and butyl acrylate. "Ethylene/methyl acrylate" means a copolymer of ethylene and methyl acrylate. "Ethylene/ethyl acrylate" means a copolymer of ethylene and ethyl acrylate. "Ethylene/butyl acrylate" means a copolymer of ethylene and butylacrylate.

Preferably, the alkyl group in the alkyl (meth)acrylate comonomer has from one to eight carbon atoms and the alkyl (meth)acrylate comonomer has a concentration range of from 5 to 45 weight percent of the ethylene/alkyl (meth)acrylate copolymer, preferably from 10 to 35 weight %, more preferably from 10 to 28 weight %. Most preferably, the alkyl group in the alkyl (meth)acrylate comonomer is methyl, ethyl or n-butyl.

Ethylene/alkyl (meth)acrylate copolymers can be prepared by processes well known in the polymer art using either autoclave or tubular reactors. Because the processes are well known to one skilled in the art, the description of which is omitted herein for the interest of brevity.

Polypropylene polymers include homopolymers, random copolymers, block copolymers and terpolymers of propylene. Because polypropylene is well known to one skilled in the art, the description of which is omitted herein for the interest of brevity.

A melt-processible, modified ionomer blend can be produced by heating a mixture of the E/X/Y copolymer or ionomer, the organic acid or salt thereof, the basic compound and optionally the non-ionomeric copolymer. For example, the components of the composition can be mixed by melt-blending the individual components; and concurrently or subsequently adding a sufficient amount of a basic compound capable of neutralization of the acid moieties (including those in the acid copolymer and in the organic acid), preferably to nominal neutralization levels greater than 70, 80, 90%, to near 100%, or to 100% or above; and optionally adding an ethylene-containing or polypropylene-containing polymer.

The organic acid or salt thereof can be present in a range of about 2 to about 50 parts (alternatively, about 4 to about 40, about 4 to 30, about 4 to 20, or about 4 to 15) parts per hundred (pph) by weight of the E/X/Y copolymer or ionomer thereof.

Treatment of acid copolymers and organic acids with basic compounds in this manner (concurrently or subsequently), without the use of an inert diluent, to prepare the composition can avoid loss of processibility or properties such as toughness and elongation to a level higher than that which would result in loss of melt processibility and properties for the ionomer alone. For example, an acid copolymer blended with organic acid(s) can be nominally neutralized to over 80%, 90%, or to about 100% or to 100% without losing melt processibility. In addition, nominal neutralization to about 100% or to 100% reduces the volatility of the organic acids.

The acid copolymer(s) or unmodified, melt-processible ionomer(s) can be melt-blended with the organic acid(s) or salt(s) and other polymers in any manner known in the art. For example, a salt and pepper blend of the components can be made and the components can then be melt-blended in an extruder.

The melt-processible, acid copolymer/organic-acid-or-salt blend can be treated with the basic compound by methods known in the art. For example, a Werner & Pfleiderer twin-screw extruder can be used to treat the acid copolymer and the organic acid with the basic compound at the same time.

The compositions can comprise additional additives including plasticizers, stabilizers including viscosity stabilizers and hydrolytic stabilizers, antioxidants, ultraviolet ray absorbers, anti-static agents, dyes, pigments or other coloring agents, fire-retardants, lubricants, foaming or blowing agents, processing aids, antiblock agents, release agents, and/or mixtures thereof. These additives may be present in the compositions from 0.01 to 15, 0.01 to 10, or 0.01 to 5 weight %.

The optional incorporation of such ingredients into the compositions can be carried out by any known process. This incorporation can be carried out, for example, by dry blending, by extruding a mixture of the various constituents, by a masterbatch technique, or the like.

In some embodiments, the polymer composition can further comprise a fire retardant such as a chemical additive. Such additives include, but are not limited to, such things as phosphorous compounds, antimony oxides, and halogen compounds, particularly bromine compounds, and others well known in the art. A loading of such additives can be between 20 to 30, or about 25% (of the final air-dried composition or air-dried film weight).

The composition can further comprise a functional additive including chemical stabilizers, bio-active species, metals, activated carbon, nano-carbon tube, nano-silica, nano-clay, nano-TiO2, zeolites, halogen compounds, or combinations of two or more thereof that may provide further protection from biological or chemical agents where "nano" denotes particle size <100 or 50 or 25 µm. The chemical stabilizer can be, for example, an anti-oxidant, and the bio-active species can be an antiseptic.

The compositions may also comprise fillers, fibers, or pulps in added quantities that may be up to 30 to 40 weight % of the composition. These materials may provide reinforcement or otherwise modify the mechanical properties of the composition, without negatively impacting the selective permeability of the composition. Fillers include, for example, inorganic materials such as carbon black, $TiO_2$, calcium carbonate ($CaCO_3$). Fibers, including chopped fibers, include glass fibers, aramid fibers, carbon fibers and the like. Pulps include, for example aramid micropulps (micropulp has a volume average length of from 0.01 to 100 micro-meters).

The polymer composition can be formed or incorporated into shaped articles including extruded or blown shapes or films, molded articles, and the like. One preferred shaped article is a film. Films can be made by known techniques such as casting the polymer composition onto a flat surface or into a film, extruding the molten polymer composition through an extruder to form a cast film, or extruding and blowing the polymer composition film to form an extruded blown film.

The films can have a thickness of from 1 to 2500 µm, with the preferred thickness for many barrier film applications being about 10 to 250 µm thick, preferably 25 to 125 µm thick. The MVTR of these films can be about 10 $Kg/m^2$/24 hours or higher for a 50-micron thick continuous film.

The composition can be used in protective garments and collective structures, such as shelters or tents, where it functions as a biological and/or chemical barrier. The polymer composition can be present as a layer of material added to the protective garments or structure, or as one component of a fabric incorporated into the protective garment or structure. In some embodiments the polymer composition can be impregnated (including dispersion) in a substrate or the substrate can be impregnated in the polymer, while in other embodiments the polymer composition can be coated directly on a substrate utilizing fabric impregnation and coating techniques that are well known in the art.

The selectively permeable membrane composition itself may be applied to any of these substrates as a film or membrane, a laminated layer or as a coating (via extrusion coating, spraying, painting or other appropriate application methods). The membrane composition can be applied to one side or both sides of the substrate. In the case where the textile substrate is coated or laminated on one side, the membrane composition can be applied to the side that will be directly exposed to the biological and/or chemical agents to provide an impermeable outer surface. Alternatively, in applications where mechanical wear or abrasion is likely, the membrane composition may be applied to the side of the textile substrate opposite the side exposed to the mechanical wear to afford protection of the polymeric composition.

In other cases, the membrane composition can also be accommodated between two layers of textiles in a sandwich-like manner. In the latter embodiment, the membrane composition is effectively protected from both sides from mechanical wear and it can therefore ensure the desired water vapor diffusion and barrier properties over an extended period of time.

Several such layer assemblies can also be assembled one above the other. For example, the configuration can comprise the selectively permeable membrane layer, a substrate layer, another selectively permeable membrane layer, another substrate layer, and so on, depending upon the particular application of the protective structure. Other configurations can comprise variations of the aforementioned sandwich configuration, including a plurality of selectively permeable membrane layers, a plurality of substrate layers, and so forth, including mixtures thereof.

Generally, the textile or porous sheet material substrate and a layer of the selectively permeable composition are arranged in overlaying or overlapping fashion to provide the protective structure. In one embodiment, the composition can be in the form of a film or sheet and the film is mechanically held or fastened in overlaying fashion adjacent to the textile. Mechanical fastening includes the use of fasteners such as snaps, zippers, hook-and-loop fasteners and the like. Mechanical fastening also includes stitching or quilting using threads or fibers. The mechanical fastening may be limited to near the respective edges of the substrate and selectively permeable layer or it may be provided in discontinuous fashion throughout the area where the layers overlay one another.

In some embodiments, the selectively permeable membrane is attached or adhered to the substrate by use of a compatible adhesive placed between the membrane layer and the substrate. To maintain water vapor permeability of the structure, in some embodiments the adhesive is present as a discontinuous layer between the membrane layer and the substrate, and in many cases, it is applied as a series of adhesive dots that cover between about 10 to 40 percent of the substrate surface. The adhesive also may be applied selectively near the edges of the membrane and the substrate.

In other embodiments, the selectively permeable membrane is attached to the substrate by high frequency (HF) welding or heat sealing. HF welding is an alternative to heat-bonding methods for adhering a film to a substrate such as the film itself, another film, or a textile fabric. HF welding involves heating only a HF-active component or HF-active layer of a structure such as a multilayer film sufficiently to soften that component. The selective heating is accomplished by treatment with high frequency radiation. The laminate can be heat sealed (thermally bonded) using any known method, included heated presses and calenders and the like, or by applying heat to the layers and then subsequently pressing them together without additional heat. In each case, the softened layer or component subsequently bonds the film structure to the substrate.

In other embodiments the selectively permeable membrane is formed at least partially in the substrate by impregnating the substrate with the membrane composition by either direct pressing of the composition into the substrate or by applying a molten mixture of the membrane composition to the substrate and then cooling the composition while it is in contact with the pores of the substrate.

In another embodiment, the selectively permeable protective structure can be in the form of a laminate wherein the selectively permeable membrane is continuously adhered, either indirectly or through at least one intervening layer, to the substrate. For example, the selectively permeable membrane is a coating applied directly on the substrate. Such coating can be applied using spreading methods known in the art such as with a rubber doctor blade or with a slit extrusion machine.

Of note is an embodiment wherein the membrane composition is applied to a textile substrate by, for example but not limitation, extrusion coating. Extrusion coating the membrane composition onto a textile can be done as follows: dried granulates of the blend (and granulates of compositions for other layers, if present) are melted in single screw extruder(s). The molten polymer(s) are passed through a flat die to form a molten polymer curtain wherein the compositions of the individual layers are present in a layered flow. The molten curtain drops onto the moving textile substrate to be immediately pressed into that substrate and quenched by a quench drum.

A film of the membrane composition can also be laminated to a textile substrate by means of an inner layer applied in molten form to adhere the film to the substrate. The process involves laying down a molten curtain of the inner layer composition between the film and substrate moving at high speeds as they come into contact with a cold (chill) roll. The melt curtain is formed by extruding the inner layer composition through a flat die.

The laminate can further comprise a layer of adhesion-promoting or contaminant blocking substance that is selectively permeable, which could also be of an abrasion resistant polymer, positioned adjacent to the selectively permeable layer. For example, this substance may contain urethane functionality and can be about 2.5 to 12 microns thick. Other polymers that can be used in this layer include a variety of elastomers, reactive materials, and adhesives. Preferably the adhesion promoting polymer layer is present as a film, however, the layer can be a coating or an impregnation of the substrate. This additional adhesion promoting polymer layer is especially useful when the laminate is made by combining the layers of the laminate by thermal pressing, bonding, calendaring and the like. In this case, the layer of abrasion resistant polymer should be compatible with the selectively permeable layer so that when the items are thermally pressed they adhere together. Other polymers that can be used in this layer include a variety of elastomers, reactive materials, and adhesives such as Hytrel® from DuPont and Pebax® from AtoChem, Co.

The protective structure may further comprise other layers such as adhesive layers, thermal insulation layers, absorptive layers, reactive layers, and the like.

Insulation layers may comprise an organic thermoplastic fiber-based material comprising, e.g., polyester, polyethylene or polypropylene. For example, the thermal insulating layer is a fiberfill batt comprising polyester. A fiberfill batt sold as Thermolite® Active Original by DuPont is suitable. Alternatively, the thermal insulating layer may comprise melt-blown fibers, such as melt-blown polyolefins, sold as THINSULATE®, by 3M.

The mechanical properties and ease of processing of the selectively permeable composition, and its ability to transport water and block organic molecules, combined with a support substrate render protective structures thereof applicable for various applications, such as, for example, chemical and/or biological protective clothing for health care or military applications. For example, the invention can comprise chemical and/or biological protective apparel comprising any of the aforementioned various embodiments of the selectively permeable protective structure.

The composition can be formed into a monolithic or continuous membrane that functions as a selectively permeable barrier. Monolithic continuous membranes, in contrast to microporous membranes, have high water-entry pressure and are waterproof and liquidproof. Therefore, monolithic membranes provide barriers to liquids such as water, while still allowing permeability to water vapor under appropriate conditions. A monolithic barrier is also effective at preventing exposure to liquid or particulate irritants, allergens and the like, including pollen, animal dander and hair.

Thus, the structure is useful as a biological barrier. A biological barrier is understood to be any structure that provides resistance to harmful or undesirable biological agents such as bacteria, microbes, viruses and the like that, for example, may be present in blood, sera, and other bodily fluids or may be present as aerosols.

"Selectively permeable" means permeation is allowed only to certain molecules in a specific state such as vapor or gas and not to other molecules or in a different state such as liquid or solid. Such molecules can be dissolved or dispersed in the matrix of certain material such as the article disclosed in the invention and thereafter be diffused or migrated through the material.

The selectively permeable membrane can be selective to liquid penetrants depending on the size and polarity of the penetrants, i.e., has selectivity so as to be capable of allowing water to diffuse through at a higher rate than virtually all organic liquids having a molecular weight higher than that of methanol. Because test data have proven that the structures described herein are effective at blocking relatively low molecular weight compounds such as dimethylmethyl phosphonate, it can be presumed that these membranes also will be very effective at blocking other compounds having similar or higher molecular weight, neat chemicals, and solutions, dispersions and emulsions thereof including chemical warfare (CW) agents such as blistering agents, e.g., mustard (HD), and G class nerve agents, e.g., Tabun (GA), Sarin (GB), Soman (GD), or combinations of two or more thereof.

The following Examples are presented to more fully demonstrate and illustrate, but are not meant to unduly limit the scope of, the invention.

EXAMPLES

In order to illustrate the moisture permeance associated with a film layer involving a selectively permeable composition as described herein, extrusion cast films were prepared from the materials listed below.

Materials Used

Ionomer 1 was a terpolymer comprising ethylene, n-butyl acrylate (23.5 weight %) and methacrylic acid (9 weight percent), neutralized to 52% (nominally) with sodium using sodium hydroxide, having a MI of 1. Ionomer 2 was a copolymer comprising ethylene and methacrylic acid (19 weight percent), neutralized to 37% (nominally) with sodium using sodium hydroxide, having a MI of 2.6.

EAC-1 was a terpolymer comprising ethylene, n-butyl acrylate (23.5 weight %) and methacrylic acid (9 weight percent), having a MI of 25. This is the base resin for Ionomer 1 prior to neutralization.

EAC-2 was a dipolymer comprising ethylene, and methacrylic acid (19 weight percent), having a MI of 300.

HSA: 12-hydroxystearic acid commercially supplied by ACME-Hardesty Co.

ISA: Iso-stearic acid commercially supplied by Arizona Chemical.

blended with the indicated fatty acid modifier and neutralized to 100% nominal neutralization with the potassium hydroxide.

TABLE 1

| Example | Ionomer | Modifier (wt. %)* | WVPV (g-mil/m$^2$-24 h) |
|---|---|---|---|
| 1 | Ionomer 2 | K stearate (40%) | 5,387 |
| 2 | Ionomer 1 | K stearate (40%) | 5,279 |
| 3 | Ionomer 2 | K iso-stearate (20%) | 10,290 |
| 4 | Ionomer 2 | K iso-stearate (40%) | 78,535 |

*Examples were brought to 100% nominal neutralization with KOH.

Examples 5-9

Additional film examples were prepared by extrusion casting.

TABLE 2

| Example | Acid copolymer (wt %) | Modifier (wt %) | Neutralizing agent (wt %) | EMA-1 (wt %) | WVPV (g-mil/m$^2$-24 h) |
|---|---|---|---|---|---|
| 5 | EAC-2 (70.63) | BEH (7.85) | MB-2 (21.25) | 0 | 9504 |
| 6 | EAC-2 (49.57) | BEH (21.24) | MB-2 (21.32) | 7.87 | 11401 |
| 7 | EAC-2 (77.57) | HSA (8.62) | K$_2$CO$_3$ (13.81) | 0 | 9844 |
| 8 | EAC-2 (67.81) | ISA (16.95) | K$_2$CO$_3$ (15.24) | 0 | 32145 |
| 9 | EAC-1 (72.75) | ISA (18.19) | K$_2$CO$_3$ (9.06) | 0 | 10485 |

BEH: behenic acid commercially supplied by Uniqema.

Base MB-1: A blend of 59.5 weight % Na$_2$CO$_3$ in an ethylene/methylacrylic acid (10 weight %) copolymer with MI of 450 g/10 minutes.

Base MB-2: A blend of 50% K$_2$CO$_3$ in an E/methyl acrylate (24 weight %) copolymer with MI of 20 g/10 minutes.

Base MB-3: A 50% K$_2$CO$_3$ solution in water.

Examples 10-16

The indicated materials were melt-blended in a twin-screw extruder at 20 lb/h (about 9 kg/h) throughput rate to provide compositions summarized in Table 3 below. Unless noted otherwise, the compositions were cast into films of 2 to 2.5 mils (except that examples 14-16 were 4 mils) thickness via a 28 mm W&P twin screw extruder.

TABLE 3

| Example | Polymer (wt %) | EMA-1 (wt %) | Modifier (wt %) | Neutralizing Agent (wt %) | MVPV (g-mil/m$^2$-24 h) |
|---|---|---|---|---|---|
| 10 | Ionomer 2 (72.57) | 0 | ISA (18.14) | KOH (9.29) | 53920 |
| 11 | Ionomer 2 (83.3) | 0 | HSA (9.3) | KOH (7.4) | 5188 |
| 12 | Ionomer 2 (69.13) | 12.84 | HSA (3.63) | MB-2 (14.39) | 4219 |
| 13 | EAC-2 (75.38) | 0 | HSA (3.14) | K?? | 10333 |
| 14 | EAC-2 (57.72) | 20.33 | HSA (3.25) | MB-2 (18.70) | 4415 |
| 15 | EAC-2 (78.40) | 0 | HSA (3.27) | MB-3 (11.15) &MB-1 (7.19) | 5079 |
| 16 | EAC-2 (59.71) | 21.03 | HSA (3.36) | MB-3 (9.67) &MB-1 (6.22) | 5006 |

Examples 1-4

Employing a Werner & Pfleiderer twin-screw extruder, ionomer 3 was melt blended with 40 weight % of potassium stearate and additional potassium hydroxide to neutralize the composition to nominally 100% neutralization to provide Example 2. Other examples in Table 1 were prepared similarly, using the indicated ionomer or ethylene acid copolymer Dimethylmethylphosphonate (DMMP) Permeation To simulate the performance of a multilayer structure comprising a film layer involving the selectively permeable composition and a woven textile against chemical agents, the following tests were conducted, using DMMP as a relatively non-toxic simulant for chemical warfare G-class nerve agents.

A vessel with an opening on top was charged with a measured amount of water containing 0.100% propylene glycol as an internal GC standard. The opening was covered with the sample film and a woven fabric overlayer [NYCO 50:50 nylon/cotton blend, 6.7 oz/yd² (0.23 kg/m²) treated with durable water repellant finish]. The layers were sealed in place and the fabric surface was treated with one 2 µL drop of DMMP (2.3 mg, obtained from Aldrich Chemical Company and used as received). The vessel is placed in a nitrogen-purged box for 19 h at 23° C. and then the DMMP concentration in the water was measured by gas chromatographic analysis. Results reported in µg of DMMP, measured in the water after 19 hours, were the average of five replicate samples. Results are shown in Table 4.

Moisture Vapor Transmission Rate (MVTR)

This was measured by a method derived from the Inverted Cup method of MVTR measurement [ASTM E 96 Procedure BW, Standard Test Methods for Water Vapor Transmission of Fabrics (ASTM 1999)]. A vessel with an opening on top was charged with water and then the opening was covered first with a moisture vapor permeable (liquid impermeable) layer of expanded-PTFE film ("ePTFE"), and then with the sample for which the MVTR was to be measured, and finally by woven fabric overlayer [NYCO 50:50 nylon/cotton blend, 6.7 oz/yd² (0.23 kg/m²) treated with durable water repellant finish]. The three layers were sealed in place, inverted for 30 minutes to condition the layers, weighed to the nearest 0.001 g, and then contacted with a dry stream of nitrogen while inverted. After 19 h at 23° C., the sample was re-weighed and the MVTR calculated (kg/m²/24 h) by means of the following equation:

$$MVTR = 1/[(1/MVTR_{obs}) - (1/MVTR_{mb})]$$

where $MVTR_{obs}$ was observed MVTR of the experiment and $MVTR_{mb}$ was the MVTR of the ePTFE moisture barrier (measured separately). The reported values were the average of results from three replicate samples.

TABLE 4

| Example | Film thickness (mm) | Simulant in water (average µg) | Std. Dev. | MVTR (kg/m² 24 h) |
|---|---|---|---|---|
| 11 | 0.035 | 12 | 8 | 7.5 |

The sample transmitted less than 15 µg of the simulant.

DMMP and moisture permeation were measured for an additional film, along with gravimetric studies of DMMP absorption into films from the vapor phase (Table 5). The films were 2 mils thick. Some samples were repressed (hand pressed, 200° C.) from the original film to obtain appropriate thickness. Comparative Example C1 was a film prepared from a non-modified ionomer.

TABLE 5

| | Permeation and vapor absorption | | | |
|---|---|---|---|---|
| Example | DMMP Permeation (µg) | DMMP vapor Absorption (%) | EVR | MVTR (kg/m² 24 h) |
| 17 | 20 ± 11 | 0.4% | 9.7 ± 0.5 | 103 ± 5 |

Composition of 17: Ionomer-2 (83.3) + HAS (9.3) + KOH (7.4)

Example 17 showed good performance in both EVR and DMMP permeation resistance. The DMMP vapor absorption of this film was negligible, even after many days. In comparison, Comparative Example C1 did not have good moisture transmission.

The invention claimed is:

1. An article comprising a substrate and a selectively permeable membrane wherein
   the article is selectively permeable to moisture having a moisture vapor transmission rate, measured according to ASTM F2298, of at least 1800 g/m²/24 h;
   the substrate comprises textile or porous sheet material;
   the membrane comprises or is produced from a composition that comprises or is produced from an organic acid-modified ionomer and optionally a non-ionomeric polymer;
   the organic acid-modified ionomer comprises one or more E/X/Y copolymers and an organic acid or salt thereof where E is derived from ethylene, X is derived from at least one $C_3$-$C_8$ α,β-ethylenically unsaturated carboxylic acid, and Y is derived from a softening comonomer;
   at least 60% of the acid moiety in the E/X/Y copolymer and organic acid is neutralized with an alkali metal; and
   the softening comonomer includes an alkyl (meth)acrylate.

2. The article of claim 1 wherein the membrane has moisture vapor transmission rate of at least 4 Kg/m²/24 hours; the organic acids or salt thereof is present in the composition from 1 to 50 weight % and includes one or more saturated or unsaturated monobasic acids having fewer than 36 carbon atoms; and at least 80% of the acid moiety in the E/X/Y copolymer and organic acid is neutralized with an alkali metal.

3. The article of claim 2 further comprises a layer including fabrics of aramid, glass fiber, or combinations thereof.

4. The article of claim 2 wherein the substrate is one or more porous films flash spun non-woven fabrics, woven fabrics of synthetic fibers, natural fibers, scrims, or filter materials.

5. The article of claim 2 wherein the substrate is one or more flash spun polypropylene or woven fabrics of synthetic fibers, or natural fibers.

6. The article of claim 2 wherein the membrane has moisture vapor transmission rate of at least 5 Kg/m²/24 hours and at least 90% of the acid moiety in the E/X/Y copolymer and organic acid is neutralized with an alkali metal.

7. The article of claim 6 wherein membrane has moisture vapor transmission rate of at least 10 Kg/m²/24 hours and the metal ion is preponderantly potassium ions.

8. The article of claim 1 including apparel for patient visitors, operating room, medical applications, or dental applications.

9. The article of claim 2 including one or more gowns, aprons, shirts, trousers, overcoats, gloves, shoes, boots, overboots, socks, hoods, hats, caps, masks, eye goggles, drapes, helmets, or breathable dressings.

10. The article of claim 2 including garments used in protection from biological agents, chemical agents, irritants, or combinations of two or more thereof.

11. The article of claim 4 wherein the article is the fabric used in tents or shelters.

12. An article comprises a substrate having impregnated therein, incorporated therein, or laminated thereon a selectively permeable composition or membrane wherein
   the composition or membrane is selectively permeable to moisture having a moisture vapor transmission rate, measured according to ASTM F2298, of at least 1.800 Kg/m²/24 h;
   the substrate comprises textile or porous sheet material;
   the composition or membrane comprises or is produced from a composition that comprises or is produced from an organic acid-modified ionomer and optionally a non-ionomeric polymer;

the organic acid-modified ionomer comprises one or more E/X/Y copolymers and an organic acid or salt thereof where E is derived from ethylene, X is derived from at least one $C_3$-$C_8$ α,β-ethylenically unsaturated carboxylic acid, and Y is derived from a softening comonomer;

at least 90% of the acid moiety in the E/X/Y copolymer and organic acid is neutralized with an alkali metal; and the softening comonomer includes an alkyl (meth)acrylate.

13. The article of claim 12 wherein the composition or membrane has moisture vapor transmission rate of at least 4 $Kg/m^2/24$ hours; the organic acids or salt thereof is present in the composition from 1 to 50 weight % and includes one or more saturated or unsaturated monobasic having fewer than 36 carbon atoms; and optionally, 100% of the acid moiety in the E/X/Y copolymer and organic acid is neutralized with an alkali metal.

14. The article of claim 13 wherein the substrate includes one or more polyurethane films, flash spun non-woven fabrics, woven fabrics of synthetic fibers, woven fabrics of natural fibers, or filter materials.

15. The article of claim 13 wherein the substrate is one or more flash spun polypropylene, woven fabrics of synthetic fibers, or natural fibers.

16. The article of claim 13 wherein the composition or membrane has moisture vapor transmission rate of at least 5 $Kg/m^2/24$ hours and at least of 60% of the acid moiety in the E/X/Y copolymer and the organic acid is neutralized with one or more alkali metal ions.

17. The article of claim 16 wherein the composition or membrane has moisture vapor transmission rate of at least 10 $Kg/m^2/24$ hours and the metal ion is preponderantly potassium ions.

18. The article of claim 12 including one or more apparels or more gowns, aprons, shirts, trousers, overcoats, gloves, shoes, boots, overboots, socks, hoods, hats, caps, masks, eye goggles, drapes, helmets, or breathable dressings wherein the apparel is for patient visitor, operating room, medical applications, or dental applications.

19. The article of claim 13 including garments used in protection from biological agents, chemical agents, irritants, or combinations of two or more thereof.

20. The article of claim 13 further comprises one or more functional additives including chemical stabilizers, bio-active species, metals, activated carbon, nano-carbon tube, nano-silica, nano-clay, nano-$TiO_2$, zeolites, halogen compounds, or combinations of two or more thereof.

21. The article of claim 13 further comprises at least one heat insulation textile layer including fabrics of aramid or glass fiber.

* * * * *